Figure 1:
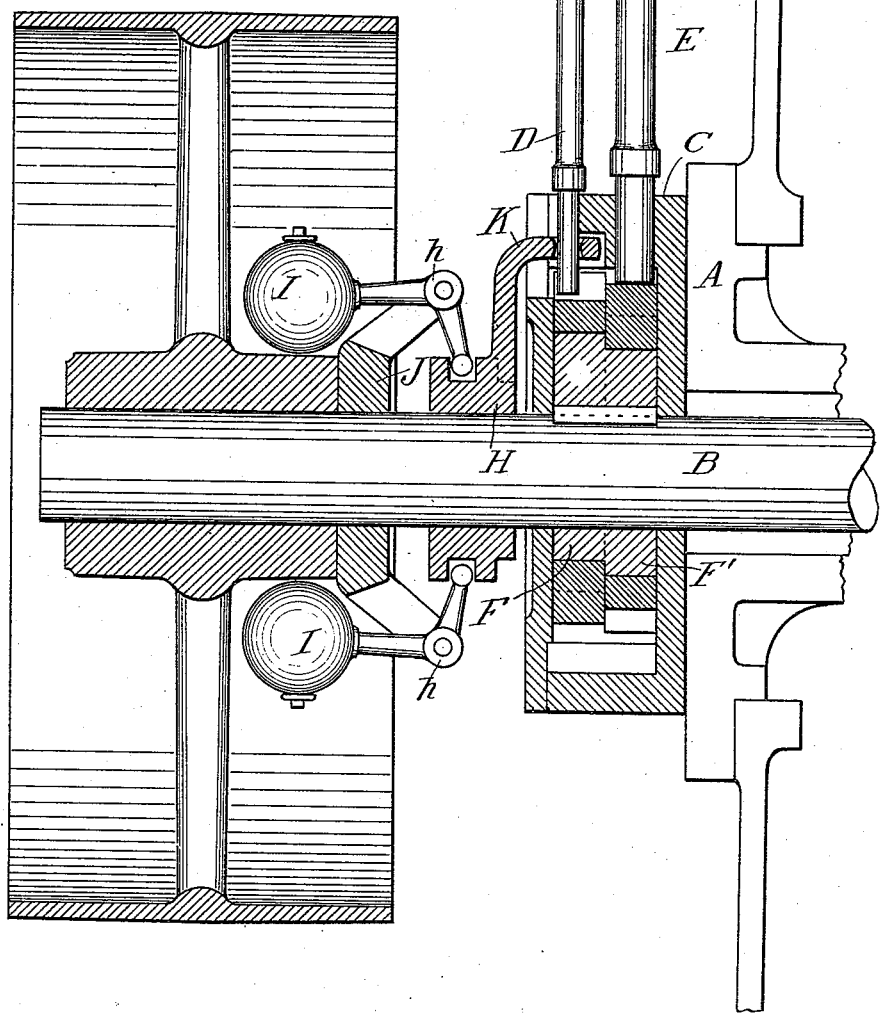

(No Model.)

2 Sheets—Sheet 1.

E. I. NICHOLS.
GOVERNOR AND VALVE MOVEMENT FOR GAS ENGINES.

No. 453,246.

Patented June 2, 1891.

Witnesses
M. R. Bryan.
Joseph P. Stevens

Inventor
Emory I. Nichols.
Spear & Seely Atty's.

(No Model.) 2 Sheets—Sheet 2.
E. I. NICHOLS.
GOVERNOR AND VALVE MOVEMENT FOR GAS ENGINES.
No. 453,246. Patented June 2, 1891.
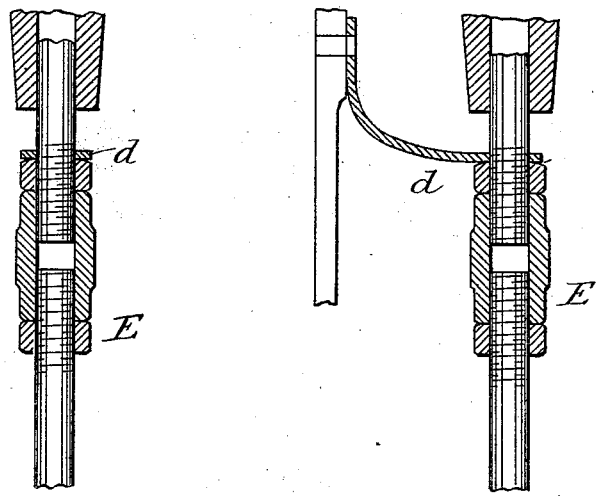
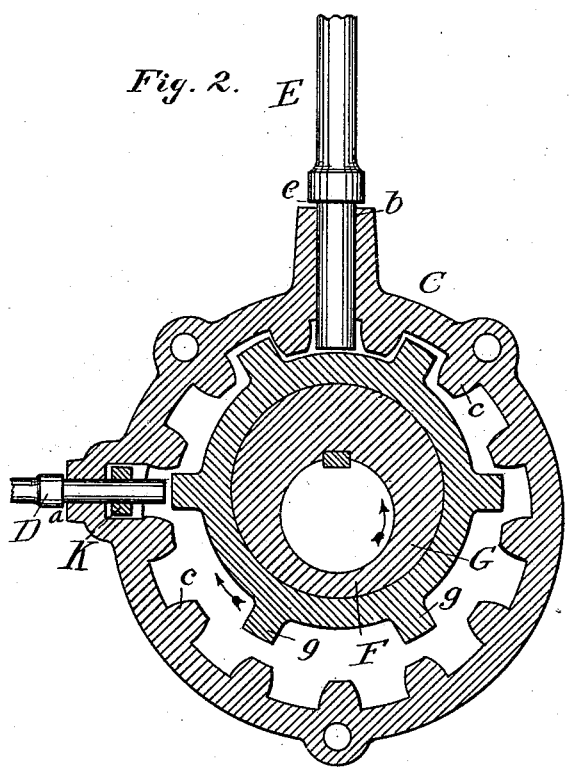
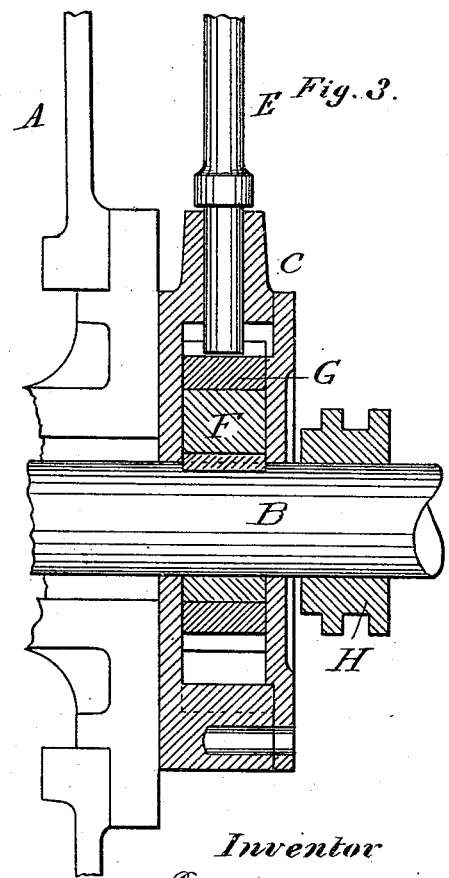
Witnesses
M. R. Bryan.
Joseph P. Stevens
Inventor
Emory I. Nichols
Spear & Seely Attys

UNITED STATES PATENT OFFICE.

EMORY I. NICHOLS, OF SAN FRANCISCO, CALIFORNIA, ASSIGNOR TO FRANK A. HUNTINGTON AND HENRY P. DIMOND, BOTH OF SAME PLACE.

GOVERNOR AND VALVE-MOVEMENT FOR GAS-ENGINES.

SPECIFICATION forming part of Letters Patent No. 453,246, dated June 2, 1891.

Application filed September 26, 1890. Serial No. 366,232. (No model.)

*To all whom it may concern:*

Be it known that I, EMORY I. NICHOLS, a citizen of the United States, and a resident of the city and county of San Francisco, State of California, have invented certain new and useful Improvements in Governors and Valve-Movements for Gas-Engines; and I do hereby declare that the following is a full, clear, and exact description of the same.

This invention relates to gas-engines of that class in which a reciprocating piston operates a crank-shaft and in which the operation of the inlet and exhaust valves of the cylinder is controlled by the crank-shaft through valve-stems extending to the said crank-shaft.

My invention relates more especially to the valve-lifting mechanism and to an improved governor for regulating the inlet-valve according to the speed of the engine.

In the best type of gas-engines as now used the valves are opened only once for two complete revolutions of the crank or strokes of the piston. Were they opened at every stroke it would be a simple matter to provide direct-acting cams on the crank-shaft so arranged as to lift the inlet and exhaust valve stems at proper intervals. To allow alternate revolutions of the operating eccentric to have no effect upon the valves has hitherto required very complicated and expensive mechanism, the practical operation of which has been far from satisfactory.

The object of my invention is to provide a simple valve-moving device operated from and by the crank-shaft, which without multiplication of the parts will accurately and unfailingly operate these valves at alternate strokes, and which from the simplicity of its construction and the consequent strength of the parts will need practically no repairs.

Without at this point going into details of the construction of my valve-moving device it is proper to give a general idea of its essential features. A casing is provided on the side of the engine-frame, through which the crank-shaft passes. The valve-stems enter this casing and are struck and lifted by teeth which form a spur-gearing upon a rotating ring. The movement of this ring by which it raises the valve-stems is imparted to it by an eccentric keyed upon the crank-shaft and loosely inclosed by the ring. The ring is differentially geared to an internal gearing upon the inside of the casing, the ratio of teeth on the ring and casing being, for example, as six to thirteen. Consequently the rotation of the eccentric and the successive engagement of the teeth of the ring with those of the casing gives a slow rotation to the ring in a direction opposite to that of the eccentric, the movement of the ring being a distance of one tooth-space on the casing at each complete rotation of the eccentric. This will be readily understood by those acquainted with the operation of differential gearing; but it will be fully explained in greater detail hereinafter. This rotation of the ring causes it to alternately miss and strike the valve-stems at each revolution of the eccentric.

For a complete comprehension of my invention reference must be made to the accompanying drawings, in which—

Figure 1 is a transverse section on the line of the crank-shaft of an engine. Fig. 2 is a longitudinal section of the casing which contains the valve-operating mechanism and of said mechanism. Fig. 3 is a transverse section of the same.

A represents a portion of the frame of an engine, and B the crank-shaft supposed to derive motion, as usual, from a reciprocating piston-rod. None of the operative parts of a gas-engine are shown in these drawings, as their exhibition is unnecessary to a complete understanding of the present invention. The crank-shaft B passes through a circular casing C, bolted to the engine-frame, Fig. 2, which is provided with openings $a$ $b$ for the admission of the inlet and exhaust valve stems D E, each stem being forced into the casing by springs $d$ and having shoulders $e$ to limit their movement. The valves themselves are not shown, but they may be of any desired kind adapted to be operated by a reciprocating stem.

The valve-operating mechanism is contained by the casing C and will be best understood by reference to Fig. 2. The interior of the casing is circular in form, and on the internal periphery is a series of spurs, teeth, or projections c. The crank-shaft, which passes centrally through the casing, has keyed to it an eccentric E, surrounding which is a loose collar or ring G, having spurs or teeth adapted to engage with those upon the casing, as shown in Fig. 2. The valves are intended to open only at every other stroke of the piston, and as these teeth g constitute the valve-stem lifters it is necessary that the eccentric be allowed to make a complete revolution without causing them to strike such stems. In the arrangement shown in Fig. 2 the valve-stems enter the casing "quartering" or ninety degrees apart. In operating the engine, therefore, commencing with the exhaust, that valve is opened, and then after a quarter-revolution of the crank-shaft the inlet-valve. The crank-shaft then finishes that revolution and makes another complete revolution before again opening the exhaust-valve. I now describe how this is accomplished. The ring G is shown as provided with six teeth g and the casing C with thirteen teeth c. The constant rotation of the eccentric shifts the position of the loose ring in the direction of travel of the eccentric and causes its teeth to engage successively with the casing; but the actual motion of the ring relative to and independent of the eccentric is a slow rotation in the opposite direction. The casing and ring form a differential gearing, and therefore at each complete revolution of the shaft in the direction of its arrow each tooth on the ring will be carried one tooth-space in the direction of its arrow. For example, one tooth is shown in Fig. 2 in position to lift the inlet-valve as soon as the eccentric shall have made a quarter-turn. When the eccentric comes round again, this tooth has moved with the arrow one space, and it requires another complete revolution of the eccentric to bring another tooth on the ring opposite the inlet-valve stem.

In Fig. 1 I have illustrated my invention as adapted to engines in which the valve-stems, instead of entering the casing at right angles to each other, are placed side by side. In this case I provide the crank-shaft with two eccentrics F F', set quartering on the shaft and each carrying a toothed ring. The operation of this device is precisely similar to that just described, the change in position of the valve-stems being exactly compensated for by the use of two cams ninety degrees apart. This will be readily understood without detailed explanation.

I have provided for my improved valve motion a special form of governor for automatically closing or partly closing the inlet-valve when the speed becomes too great. This governor is shown in Fig. 1, where H represents a loose collar adapted to slide upon the crank-shaft and having a circular groove for the levers h of the governor-balls I, pivoted upon a collar J, fixed on the shaft. An arm extends from the collar H through a slot in the casing and is connected to the valve-stem. When the speed is increased to too great an extent, the collar H is drawn out as the balls spread, and the valve-stem is pulled directly outward through the slot, and therefore out of reach of the teeth g, so that the valve is not opened until the speed decreases sufficiently to permit the governor to return the valve-stem to its original position.

It will be seen that all the parts of my improved device are simple in construction, and may thus be made exceedingly strong. Practically they will run indefinitely without repairs, and it is only necessary to occasionally fill up the casing with oil to take up what little friction is caused by the internal gearing.

What I claim is—

1. In a gas-engine, the combination of a toothed ring operated by an eccentric upon the engine-shaft, a valve-stem adapted to be lifted by said ring, and a speed-governor connected directly to said valve-stem, whereby it may be moved out of line with said ring, substantially as described.

2. A valve-lifter for gas-engines, composed of a stationary internal gear and a toothed ring geared differentially thereto and operated by an eccentric upon the crank-shaft, substantially as set forth.

3. A valve-lifter for gas-engines, consisting of a toothed ring geared differentially to and within an inclosing casing and operated by an eccentric upon the crank-shaft, substantially as set forth.

4. In a gas-engine, the combination of a valve-stem, a valve-stem lifter, a shaft carrying a sliding collar and governor-balls for operating the collar, and a rigid connection between the collar and valve-stem for operating it positively into and out of the line with the lifter, substantially as described.

5. In a gas-engine, and in combination, a casing through which passes the crank-shaft of the engine, valve-stems entering said casing, an eccentric on the crank-shaft, a loose ring surrounding the eccentric, and differential teeth on the casing and ring, substantially as set forth.

6. In a gas-engine, the combination of a casing, valve-stems entering said casing, a ring shifted by an eccentric on the crank-shaft, and differential teeth upon the ring and casing, all constructed and arranged so that the teeth upon the said ring lift said valve-stems at alternate revolutions of the crank-shaft, substantially as set forth.

7. The combination of a casing secured to the engine-frame, valve-stems entering the casing, a crank-shaft passing through said casing and having an eccentric fixed upon it, a ring loose on the eccentric and provided with an even number of teeth, and a series of teeth on the casing equal in number to one more than twice as many as those on the ring, all constructed and arranged so that each complete revolution of the eccentric causes the ring to move in the opposite direction a distance equal to one tooth-space on the casing, substantially as and for the purposes set forth.

8. A valve-moving mechanism for gas-engines, consisting of a fixed casing having an internal spur-gearing, a ring within such casing operated by an eccentric on the engine-shaft and provided with a differential spur-gearing, whereby it derives a rotation in a direction opposite to that of the eccentric, all in combination with valve-stems entering the casing, substantially as described.

9. The combination of a casing secured to the engine-frame, the engine-shaft passing through said casing and having valve-lifting devices mounted upon and operated by it, and spring-pressed valve-stems entering said casing and provided with stops to limit their motion, substantially as described.

In testimony whereof I have hereunto signed my name, in the presence of two witnesses, the 18th day of September, 1890.

EMORY I. NICHOLS.

Witnesses:
S. W. SEELY,
JAMES MASON.